(No Model.)
F. P. BURNHAM.
LOWER REAR FORK AND MAIN DRIVING SPROCKET FOR BICYCLES.
No. 600,329. Patented Mar. 8, 1898.
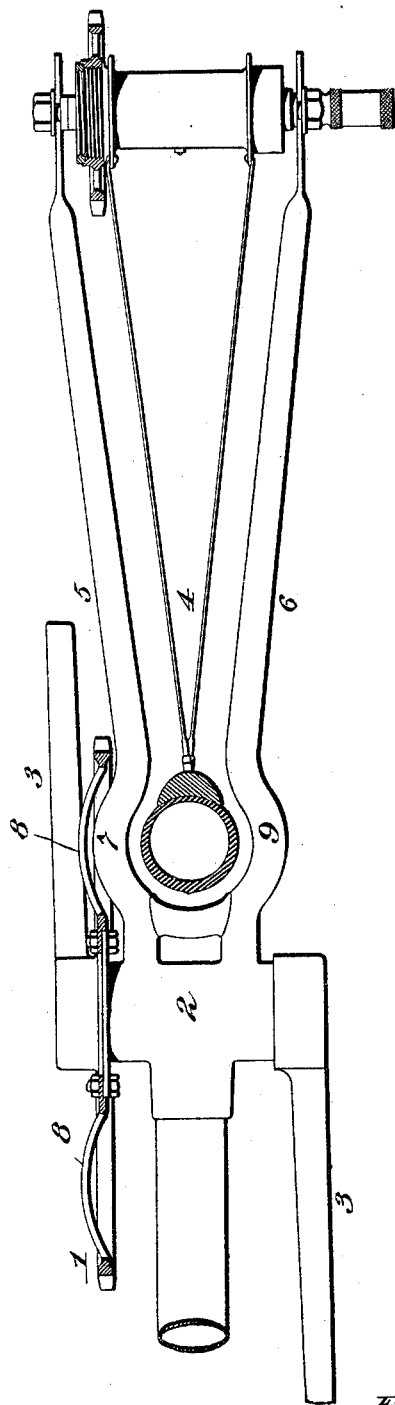
Witnesses.
J. F. Coleman
Archie G. Ree
Inventor:
Franklin P. Burnham
by Frank L. Dyer
his Atty.

United States Patent Office.

FRANKLIN PIERCE BURNHAM, OF MIDDLETOWN, OHIO, ASSIGNOR TO THE MIAMI CYCLE AND MANUFACTURING COMPANY, OF SAME PLACE.

LOWER REAR FORK AND MAIN DRIVING-SPROCKET FOR BICYCLES.

SPECIFICATION forming part of Letters Patent No. 600,329, dated March 8, 1898.

Application filed December 1, 1896. Serial No. 614,087. (No model.)

*To all whom it may concern:*

Be it known that I, FRANKLIN PIERCE BURNHAM, a citizen of the United States, residing at Middletown, county of Butler, State of Ohio, have invented an Improvement in Lower Rear Forks and Main Driving-Sprockets for Bicycles, of which the following is a specification, reference being had to the accompanying drawing.

The object of my invention is to so construct, arrange, and proportion the elements comprising the lower rear forks, hanger-bracket, and main driving sprocket-wheel of a bicycle as to considerably narrow the tread, shorten the chain, and lessen the distance between the hanger-bracket and the rear-wheel axle, while at the same time allowing a relatively large driving sprocket-wheel to be employed. I accomplish this object by extending the lower rear fork on the sprocket side of the machine inward toward the wheel-rim and then curving said fork outward to form a bend therein coincident with the rear tire, whereby the rear tire may be located in relative proximity to the hanger-bracket to lessen the distance between the hanger-bracket and the rear-wheel axle and thereby shorten the chain, by mounting the main driving sprocket-wheel upon the hanger-bracket with its hub immediately adjacent to the lower rear fork at that side to make the tread very narrow, and, finally, by dishing the web or spokes of the main driving sprocket-wheel outward, so as to clear but work in close relation with the bend in the lower rear fork referred to, whereby the main driving sprocket-wheel actually overlaps the rear-wheel tire, so that said sprocket-wheel may be made relatively large.

In order that symmetry of the rear forks may be preserved, I may bend both of said forks outward at the rear tire, although this is not strictly necessary.

In order that my invention may be understood, attention is directed to the accompanying drawing, wherein I illustrate a plan view, partly in section, of the lower rear forks, rear wheel, crank-hanger, main driving-sprocket, and cranks of a bicycle.

1 is the main driving-sprocket, mounted on the crank-hanger 2 in any well-known way, preferably in the manner described in Patent No. 550,587, granted to J. D. Alsup and myself December 3, 1895.

3 3 are the cranks which rotate the sprocket 1.

4 is the rear wheel, and 5 6 are the lower rear forks, which are connected to the hanger-bracket 2 in the usual way. The rear fork 5 on the sprocket side of the machine extends in toward the tire of the rear wheel, or, in other words, it is extended more or less parallel with the spokes of the rear wheel, and at the rear-wheel tire it is formed in a bend 7, which clears the tire. The spokes or web of the main driving sprocket-wheel 1 are dished at 8, as shown, so as to clear the bend 7 of the fork 5 and at the same time allow the teeth of the sprocket-wheel to work close to the rear fork 5 and in line with the hub of the main sprocket-wheel.

Instead of extending the fork 5 gradually inward toward the rear tire, as shown, to accommodate the rim of the sprocket-wheel, the said rear fork may, at a point a short distance in the rear of the main sprocket-wheel, be bent inward quite sharply to accommodate the rim of said sprocket-wheel in the same way and then be bent outward to accommodate the rear-wheel tire, the bends in said fork being therefore substantially S-shaped.

In order that the machine may be symmetrical, the rear fork 6 may extend inward the same way as the fork 5 and be provided with a bend 9 coincident with the tire of the rear wheel.

A bicycle equipped with my invention may have a very narrow tread, since the rear fork on the sprocket side closely follows the outline of the rear wheel, and the sprocket is so constructed as to work in close engagement with the said fork. Furthermore, the distance between the hanger-bracket and the rear-wheel axle will be less than heretofore, since the tire of the rear wheel may work in relative proximity to the hanger-bracket, and for the same reason the chain will be shortened, and, finally, by having the main driving sprocket-wheel actually overlapping the rear-wheel tire the said sprocket-wheel may be made relatively large. It will be observed that if the main driving sprocket-wheel did not overlap the rear-wheel tire the distance between the hanger-bracket and rear-wheel axle would be considerably increased and the chain correspondingly lengthened, while if said sprocket-wheel is not provided with a dished web or spokes closely following the rear fork on the sprocket side, which in turn is curved to accommodate the rear-wheel tire, the tread of the machine would have to be considerably greater.

Having now described my invention, what I claim as new therein, and desire to secure by Letters Patent, is as follows:

1. The combination of the hanger-bracket and rear forks, the rear wheel mounted in said forks with its tire working in relative proximity to the hanger-bracket, the rear fork on the sprocket side of the machine having a bend therein to accommodate the rear-wheel tire, and a main driving sprocket-wheel mounted on said hanger-bracket, the spokes of said sprocket-wheel being dished to pass the said bend in the rear fork, substantially as described.

2. The combination of the hanger-bracket and rear forks, the rear wheel mounted in said forks with its tire working in relative proximity to the hanger-bracket, said forks having bends therein to accommodate the rear-wheel tire, and a main driving sprocket-wheel mounted on said hanger-bracket, the spokes of said sprocket-wheel being dished to pass the said bend in the rear fork at that side of the machine, substantially as set forth.

FRANKLIN PIERCE BURNHAM.

Witnesses:
JAS. L. YOUNG,
J. J. BURKHOLDER.